United States Patent
Gayton et al.

(10) Patent No.: US 10,023,011 B2
(45) Date of Patent: Jul. 17, 2018

(54) TIRE COMPRISING A TREAD MADE UP OF SEVERAL ELASTOMERIC COMPOUNDS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Christophe Gayton, Clermont-ferrand (FR); Philippe Gervais, Clermont-ferrand (FR); Hichem Rehab, Clermont-ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 110 days.

(21) Appl. No.: 14/650,966

(22) PCT Filed: Dec. 2, 2013

(86) PCT No.: PCT/EP2013/075247
§ 371 (c)(1),
(2) Date: Jun. 10, 2015

(87) PCT Pub. No.: WO2014/090621
PCT Pub. Date: Jun. 19, 2014

(65) Prior Publication Data
US 2017/0008345 A1 Jan. 12, 2017

(30) Foreign Application Priority Data
Dec. 10, 2012 (FR) ...................................... 12 61835

(51) Int. Cl.
*B60C 11/00* (2006.01)
*B60C 11/03* (2006.01)

(52) U.S. Cl.
CPC ........ *B60C 11/0075* (2013.01); *B60C 11/005* (2013.01); *B60C 11/0008* (2013.01);
(Continued)

(58) Field of Classification Search
CPC ......... B60C 2011/0025; B60C 11/0075; B60C 11/00; B60C 11/0008; B60C 11/005; B60C 11/03
(Continued)

(56) References Cited

U.S. PATENT DOCUMENTS 6,247,512 B1 * 6/2001 Radulescu .............. B60C 11/18
152/209.5
8,217,103 B2 * 7/2012 Thiele ................... B60C 1/0016
524/262
(Continued)

FOREIGN PATENT DOCUMENTS

EP 2457743 5/2012
FR 2952855 5/2011
(Continued)

OTHER PUBLICATIONS

JP 62-196704U to Misao Kawaba, Tetsuro Kobayashi; Tread Structure of High-Performance Pneumatic Tire; Bridgestone Corporation.*
(Continued)

*Primary Examiner* — Joseph S Del Sole
*Assistant Examiner* — Cedrick S Williams
(74) *Attorney, Agent, or Firm* — Dickinson Wright PLLC

(57) ABSTRACT

A tire the tread of which contains at least three circumferential grooves, having at least three radially superposed layers of elastomeric compounds.
(Continued)

A first elastomeric compound constituting the first layer forming the radially outer part of the tread has a maximum value of tan(δ)max, greater than 0.110, a second elastomeric compound constituting the second layer radially on the inside has a tan(δ)max at least 10% lower than the first elastomeric compound, the radially innermost third layer of the tread consists of at least two first parts and of at least three second parts axially, each one in contact with at least one of the at least two first parts, the at least two first parts axially centered on a radial plane passing through one of the at least three circumferential grooves consisting of the second compound and the at least three second parts consisting of a third elastomeric compound having a maximum value of tan(δ), denoted tan(δ)max, at least 10% lower than the second elastomeric compound.

8 Claims, 1 Drawing Sheet

(52) U.S. Cl.
CPC ....... *B60C 11/03* (2013.01); *B60C 2011/0025* (2013.01); *B60C 2011/0341* (2013.01); *B60C 2200/06* (2013.01)

(58) Field of Classification Search
USPC .................................. 152/209.5, 209.3, 905
See application file for complete search history.

(56) References Cited

U.S. PATENT DOCUMENTS

| 2006/0048874 | A1* | 3/2006 | Maruoka | B29D 30/3028 |
| | | | | 152/209.5 |
| 2010/0018618 | A1* | 1/2010 | Moorhead | B60C 11/00 |
| | | | | 152/209.5 |
| 2012/0132331 | A1 | 5/2012 | Collette et al. | |
| 2012/0285590 | A1* | 11/2012 | Sandstrom | B60C 1/0016 |
| | | | | 152/209.5 |
| 2012/0298271 | A1 | 11/2012 | Bijaoui | |

FOREIGN PATENT DOCUMENTS

| GB | 1255952 | A | * | 12/1971 | ........... B60C 1/0016 |
| GB | 1255952 | A | * | 12/1971 | ........... B60C 1/0016 |
| JP | 62196704 | A | * | 8/1987 | |
| JP | 04252706 | A | * | 9/1992 | |
| JP | H1148263 | | | 2/1999 | |

OTHER PUBLICATIONS

International Search Report for PCT/EP2013/075247 dated Jan. 27, 2014.

* cited by examiner

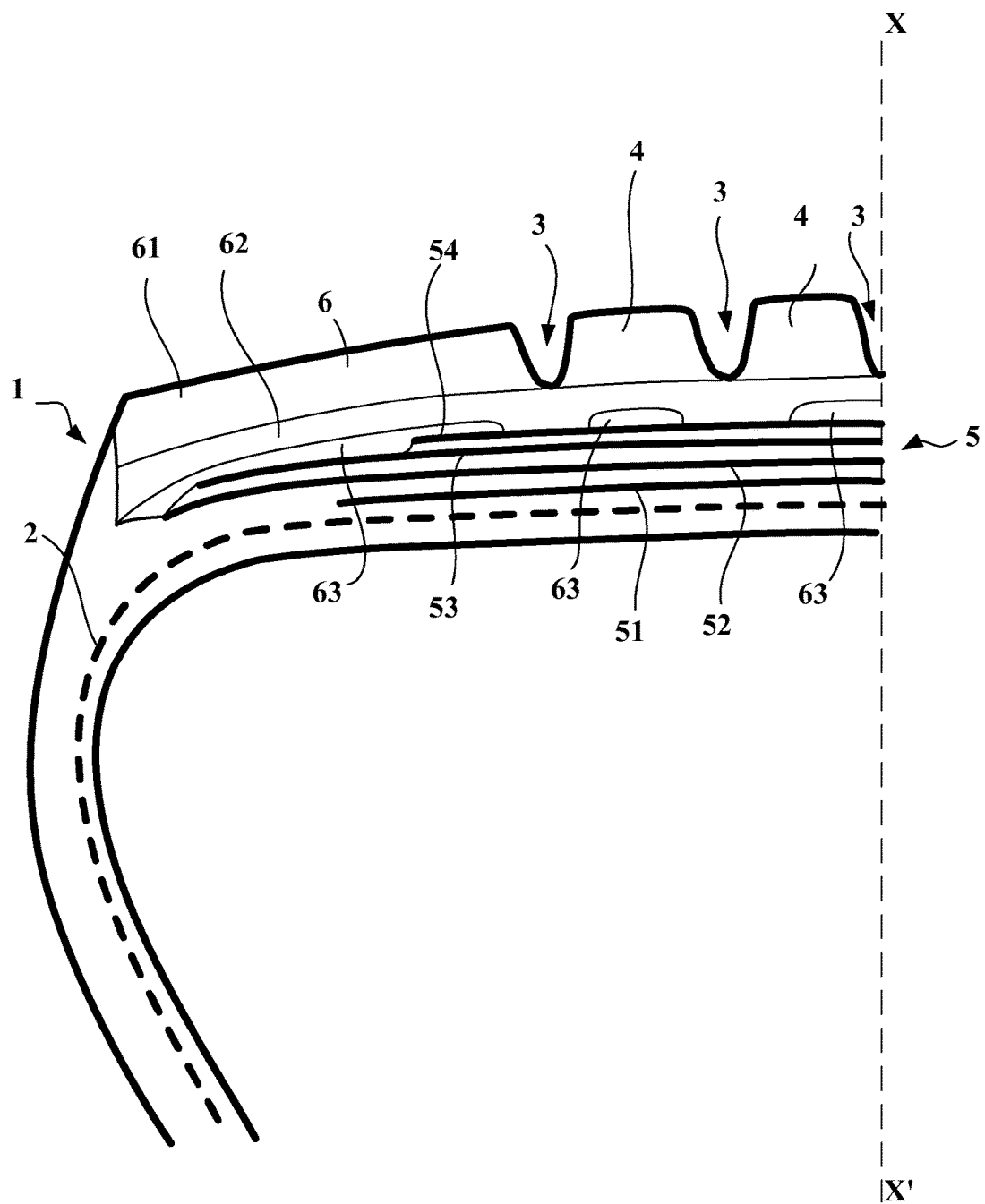

TIRE COMPRISING A TREAD MADE UP OF SEVERAL ELASTOMERIC COMPOUNDS

This application is a 371 national phase entry of PCT/EP2013/075247, filed 2 Dec. 2013, which claims benefit of French Patent Application No. 1261835, filed 10 Dec. 2012, the entire contents of which are incorporated herein by reference for all purposes.

BACKGROUND

1. Field

The present disclosure relates to a tire with a radial carcass reinforcement, and more particularly a tire intended for fitting to vehicles carrying heavy loads and travelling at sustained speeds, such as lorries, tractors, trailers or buses, for example.

2. Description of Related Art

In the tires of heavy goods vehicles, the carcass reinforcement is generally fixed on either side in the area of the bead and is surmounted radially by a crown reinforcement made up of at least two layers, superimposed and formed of threads or cords which are parallel in each layer and crossed from one layer to the next forming angles of between 10° and 45° with the circumferential direction. The said working layers forming the working reinforcement may be further covered by at least one layer, called the protective layer, formed by reinforcing elements which are advantageously metallic and extensible and are called elastic. It may also comprise a layer of metal threads or cords having low extensibility, forming an angle of between 45° and 90° with the circumferential direction, this ply, called the triangulation ply, being radially located between the carcass reinforcement and the first crown ply, referred to as the working ply, formed by parallel threads or cords lying at angles not exceeding 45° in absolute value. The triangulation ply forms a triangulated reinforcement with at least the said working ply, this reinforcement having low deformation under the various stresses which it undergoes, the triangulation ply essentially serving to absorb the transverse compressive forces acting on all the reinforcing elements in the crown area of the tire.

In the case of tires for "heavy-duty" vehicles, just one protective layer is usually present and its protective elements are, in the majority of cases, oriented in the same direction and with the same angle in absolute value as those of the reinforcing elements of the radially outermost and thus radially adjacent working layer. In the case of construction plant tires intended for running on more or less uneven ground, the presence of two protective layers is advantageous, the reinforcing elements being crossed from one layer to the next and the reinforcing elements of the radially inner protective layer being crossed with the inextensible reinforcing elements of the radially external working layer adjacent to the said radially internal protective layer.

Radially on the outside of the crown reinforcement is the tread usually made up of polymeric materials intended to come into contact with the ground in the contact patch in which the tire makes contact with the ground.

Cords are said to be inextensible when the said cords, under a tensile force equal to 10% of the breaking force, exhibit a relative elongation of at most 0.2%.

Cords are said to be elastic when the said cords exhibit, under a tensile force equal to the breaking load, a relative elongation at least equal to 3% with a maximum tangent modulus of less than 150 GPa.

The circumferential direction of the tire, or longitudinal direction, is the direction corresponding to the periphery of the tire and defined by the direction in which the tire runs.

The axis of rotation of the tire is the axis about which it turns in normal use.

A radial or meridian plane is a plane containing the axis of rotation of the tire.

The circumferential mid-plane, or equatorial plane, is a plane which is perpendicular to the axis of rotation of the tire and divides the tire into two halves.

The transverse or axial direction of the tire is parallel to the axis of rotation of the tire. An axial distance is measured in the axial direction. The expression "axially on the inside of or axially on the outside of, respectively" means "of which the axial distance, measured from the equatorial plane, is respectively less than or greater than".

The radial direction is a direction that intersects the axis of rotation of the tire and is perpendicular thereto. A radial distance is measured in the radial direction. The expression "radially on the inside of or radially on the outside of" respectively means "of which the radial distance, measured from the axis of rotation of the tire, is respectively less than or greater than".

Certain present-day tires, referred to as "road tires", are intended to run at high speed and over increasingly long journeys, because of improvements to the road network and the growth of motorway networks worldwide. Unquestionably, the set of conditions in which a tire of this type is required to run enables the distance covered to be increased because there is less tire wear; however, the endurance of the tire, and particularly that of the crown reinforcement, is adversely affected.

This is because stresses are present in the crown reinforcement; more particularly, there are shear stresses between the crown layers, combined with a significant rise in the operating temperature at the ends of the axially shortest crown layer, resulting in the appearance and propagation of cracks in the rubber at the said ends. This problem exists in the case of edges of two layers of reinforcing elements, the said layers not necessarily being radially adjacent.

In order to limit excessive temperature increases in the crown of the tire, the materials of which the tread is made are advantageously chosen to have hysteresis losses suited to the operating conditions of the tire.

Moreover, in order to improve the endurance of the crown reinforcement of the type of tire being studied, solutions relating to the structure and quality of the layers and/or profiled elements of rubber compounds which are positioned between and/or around the ends of plies and, more particularly, the ends of the axially shortest ply have already been provided.

In order to improve the resistance to degradation of rubber compounds located in the vicinity of the edges of the crown reinforcement, patent FR 1 389 428 recommends the use, in combination with a low-hysteresis tread, of a rubber profiled element covering at least the sides and marginal edges of the crown reinforcement and made up of a rubber compound with low hysteresis.

In order to avoid separations between crown reinforcement plies, patent FR 2 222 232 teaches the coating of the reinforcement ends with a pad of rubber whose Shore A hardness is different from that of the tread surmounting the said reinforcement, and greater than the Shore A hardness of the profiled element of rubber compound placed between the edges of carcass reinforcement and crown reinforcement plies.

French application FR 2 728 510 proposes arranging, on the one hand, between the carcass reinforcement and the crown reinforcement working ply radially closest to the axis of rotation an axially continuous ply formed of inextensible metal cords making with the circumferential direction an angle at least equal to 60° and of which the axial width is at least equal to the axial width of the shortest working crown ply and, on the other hand, between the two working crown plies an additional ply formed of metallic elements oriented substantially parallel to the circumferential direction.

French application WO 99/24269 further proposes, on each side of the equatorial plane and in the immediate axial continuation of the additional ply of reinforcing elements substantially parallel to the circumferential direction, that the two working crown plies formed of reinforcing elements crossed from one ply to the next be coupled over a certain axial distance and then uncoupled using profiled elements of rubber compound over at least the remainder of the width that the said two working plies have in common.

This improvement in the endurance of tires means that the possibility of retreading when the tread has worn away can at least be contemplated. Specifically, where there is a desire to retread the tire after the tread has worn away, in order to optimize the use of the new tread the tire that is to be retreaded must not be in too advanced a state of ageing.

In order to increase the life of the tires still further, it is common practice to choose polymeric materials that have improved wear resistance properties from which to make the tread. Because such materials usually have an adverse effect on hysteresis properties it is also known practice to make the tread of a tire from a radial superposition of two different materials in order to obtain a wear properties-hysteresis properties compromise that is satisfactory for the applications envisaged.

Such tires are, for example, described in document U.S. Pat. No. 6,247,512. That document describes the superposition of two layers of materials to form the tread, the external material coming into contact with the ground being notably better performing in terms of wear whereas the internal material has hysteresis properties that allow the increases in temperature of the tire in the crown region to be limited.

Tires produced in this way are entirely satisfactory for the aforementioned road applications. In order to provide the possibility of retreading, it is, however, recommended to avoid excessive degradation of the internal material as this wears away relatively rapidly by comparison with the external material, so as not to risk damage to the tire reinforcement.

Accordingly, the use of the tread of such tires cannot be entirely optimized without compromising the possibility of retreading the tire.

SUMMARY

The inventors therefore set themselves the task of being able to provide tires that can run over an ever greater distance before retreading needs to be envisaged, and in which the increases in temperature in the crown region are limited in order to comply with the desired hysteresis properties.

This object has been achieved according to an embodiment of the invention by a tire with a radial carcass reinforcement, comprising a crown reinforcement itself capped radially by a tread, the tread pattern of which comprises at least three circumferential grooves, which is connected to two beads by two side walls, the said tread comprising at least three radially superposed layers of elastomeric compounds, a first elastomeric compound constituting the first layer forming the radially outer part of the tread having a maximum value of $\tan(\delta)$, denoted $\tan(\delta)$max, greater than 0.110, a second elastomeric compound constituting the second layer radially on the inside of and in contact with the said first layer of elastomeric compound having a maximum value of $\tan(\delta)$, denoted $\tan(\delta)$max at least 10% lower than that of the first elastomeric compound, the radially innermost third layer of the tread consisting of at least two first parts and of at least three second parts axially, each one in contact with at least one of the said at least two first parts, the said at least two first parts axially centered on a radial plane passing through one of the said at least three circumferential grooves consisting of the second compound and the said at least three second parts consisting of a third elastomeric compound having a maximum value of $\tan(\delta)$, denoted $\tan(\delta)$max, at least 10% lower than that of the second elastomeric compound.

The loss factor, $\tan(\delta)$, is a dynamic property of the layer of rubber compound. It is measured on a viscosity analyzer (Metravib VA4000) according to Standard ASTM D 5992-96. The response of a test specimen consisting of two cylindrical pellets each 2 mm thick and one centimeter in diameter is recorded (the test specimen is made from samples taken from a tire midway up the height of the layer concerned as close as possible to the region of the equatorial plane in a region that is thick enough to be able to form the test specimen), the specimen being subjected to simple alternating sinusoidal shear loadings at a frequency of 10 Hz, at a temperature of 60° C. The sweep covers an amplitude of deformation from 0.1 to 50% peak to peak (on the outbound cycle) then from 50% to 1% peak to peak (on the return cycle). The results made use of are the complex dynamic shear modulus (G*) and the loss factor $\tan(\delta)$. For the outbound cycle, the maximum value of $\tan(\delta)$ observed, denoted $\tan(\delta)_{max}$, is indicated.

The rolling resistance is the resistance appearing when the tire is rolling, and reveals the increase in temperature of the said tire. It is thus represented by the hysteresis losses associated with the deformation of the tire during one revolution. The values of $\tan(\delta)$ of the materials used are measured at 10 Hz between 30 and 100° C. in order to incorporate the effect of the various frequencies of deformation brought about by the revolving of the tire. The value of $\tan(\delta)$ at 60° C. thus corresponds to an indication of the rolling resistance of the tire when it is being run.

The inventors have first of all been able to demonstrate that combining the various elastomeric compounds as described hereinabove makes it possible to reach a compromise between the wear-resistance properties and increases in temperature in the crown region of the tire that is satisfactory for the road uses as described hereinabove. Specifically, the combination as described of the various compounds makes it possible to reduce the overall hysteresis of the tire, the radially innermost elastomeric compounds compensating for the high hysteresis properties of the radially outermost compound. Indeed the radially outermost compound selected for example for its stiffness properties leading to high wear performance encourages increases in temperature of the tread.

The second layer of elastomeric compound according to an embodiment of the invention has a hysteresis that makes it possible to limit temperature increases and may be selected with stiffness properties that lead to satisfactory performance in terms of wear at the end of tread life, when the said layer may come into contact with the ground after the first layer has worn away.

This selection of second compound is also favorable to tire performance in terms of rolling resistance.

Advantageously according to an embodiment of the invention, the maximum value of tan($\delta$), denoted tan($\delta$)max, of the second elastomeric compound is at least 40% lower than that of the first elastomeric compound.

The radially innermost third layer consists in part of the third elastomeric compound which further contributes to limiting increases in temperature of the tread and improves the rolling resistance properties of the tire.

Advantageously according to an embodiment of the invention, the maximum value of tan($\delta$), denoted tan($\delta$)max of the third elastomeric compound is at least 20% lower than that of the second elastomeric compound.

The selection of compounds for obtaining the desired hysteresis properties of this third compound usually leads to properties in terms of cohesion that are not very favorable to tire performance in terms of wear. The inventors have also been able to demonstrate that the abovementioned makeup of the third layer which consists in part of the second elastomeric compound makes it possible to avoid contact between the ground and this third compound at the end of the life of the tread. Furthermore, the presence of the second elastomeric compound in the parts of the third layer that are axially centered on radial planes passing through circumferential grooves means that it is possible to contemplate regrooving the tread before potentially retreading thereby achieving an even greater distance before retreading.

For reasons concerned with correct operation of the tread pattern of a tire, the regrooving step may be limited to certain grooves present on a new tire, the expected behavior and/or effects not being the same depending on the degree of wear of the tire, as the thickness of the tread changes. Accordingly it is entirely possible for the number of first parts of the third layer to be lower than the number of grooves present on the new tire. The said first parts of the third layer are present only radially on the inside of grooves intended to be recut.

Within the meaning of the invention, the cohesion of a rubber compound is assessed from stress measurements by establishing a force/elongation at breakage curve.

The breaking stresses (in MPa) and the elongations at break (in %) are also measured. The tensile measurements for determining the breakage properties are carried out at a temperature of 60° C.±2° C. and under standard hygrometry conditions (50±5% relative humidity), according to French Standard NF T 40-101 (December 1979).

According to one preferred embodiment of the invention, the first elastomeric compound constituting the radially outermost first layer of the tread has a G* modulus greater than 1.7 MPa.

Such stiffness values for the first elastomeric compound are particularly favorable to the wear properties of the tread and contribute favorably to the distance the said tread can cover before retreading is required.

For preference also according to an embodiment of the invention, the second elastomeric compound constituting the second layer has a G* modulus greater than 1.2 MPa.

Such a second elastomeric compound offers a quite favorable compromise between performance in terms of wear and performance in terms of the increase in temperature of the elastomeric compound.

One advantageous alternative form of the invention is that the second elastomeric compound has a maximum value of tan($\delta$), denoted tan($\delta$)max of between 0.060 and 0.110.

These values give the second compound sufficient hysteresis properties that the temperatures of the tread can be appreciably reduced.

Advantageously too, the third elastomeric compound has a maximum value of tan ($\delta$), denoted tan($\delta$)max, less than 0.060.

Such values of tan($\delta$)max of the third compound also favors tire operation with tread temperatures favorable to better tire endurance and improved performance in terms of rolling resistance.

According to one advantageous alternative form of the invention, the ratio of the volume of the first elastomeric compound to the sum of the volumes of the three elastomeric compounds is between 25 and 70%.

Advantageously too, the ratio of the volume of the second elastomeric compound to the sum of the volumes of the three elastomeric compounds is between 10 and 40%.

The profile of the second layer which is made up of the second elastomeric compound, when viewed in a meridian section of the tire is such that this compound appears more or less simultaneously across the entire width of the tread as the said tread wears. The designer of the tire will know how to define such a profile according to the size and use of the tire.

Advantageously also, the ratio of the volume of the third elastomeric compound to the sum of the volumes of the three elastomeric compounds is less than 25%.

These volume ratios of the various layers will allow the designer of the tire to vary the compromise between wear performance, rolling resistance performance and possibly endurance performance as required, while still remaining within the context of the invention.

According to an embodiment of the invention, the abovementioned volume measurements are performed on tires in the new condition which have not been driven on and which therefore do not display any tread wear.

One alternative form of the invention also provides a fourth layer which is radially furthest towards the inside and in contact with the crown reinforcement and advantageously consists of an elastomeric compound identical to the third elastomeric compound. The presence of this fourth layer may make it possible to avoid problems of the second elastomeric compound sticking to the metal, this constituting the parts of the third layer radially in contact with the grooves. Specifically, the desired properties for this second elastomeric compound may lead to the selection of compounds for which the properties of adhesion to metal are degraded by comparison with other compounds.

According to one embodiment of the invention, the crown reinforcement of the tire is formed of at least two working crown layers of inextensible reinforcing elements, crossed from one layer to the other, forming, with the circumferential direction, angles of between 10° and 45°.

According to other embodiments of the invention, the crown reinforcement further comprises at least one layer of circumferential reinforcing elements.

One embodiment of the invention also makes provision for the crown reinforcement to be supplemented radially on the outside by at least one additional layer, referred to as a protective layer, of reinforcing elements, called elastic, oriented with respect to the circumferential direction at an angle of between 10° and 45° and in the same direction as the angle formed by the inextensible elements of the working layer radially adjacent to it.

According to any one of the embodiments of the invention mentioned hereinabove, the crown reinforcement may further be supplemented, radially on the inside between the carcass reinforcement and the radially internal working layer closest to the said carcass reinforcement, by a triangulation layer of inextensible metal reinforcing elements made of steel forming with the circumferential direction an angle greater than 60° and in the same direction as the direction of the angle formed by the reinforcing elements of the radially closest layer of the carcass reinforcement.

BRIEF DESCRIPTION OF DRAWINGS

Further details and advantageous features of embodiments of the invention will become evident hereinafter from the description of some embodiments of the invention given with reference to the FIGURE which depicts a meridian view of a design of tire according to one embodiment of the invention.

DETAILED DESCRIPTION OF SPECIFIC EMBODIMENTS

The FIGURE is not represented to scale in order to make it easier to understand. The FIGURE shows only a half-view of a tire which extends symmetrically about the axis XX' which represents the circumferential mid-plane, or equatorial plane, of a tire.

In the FIGURE, the tire 1, of size 275/70 R 22.5, comprises a radial carcass reinforcement 2 anchored in two beads around bead wires, not depicted in the drawing. The carcass reinforcement 2 is formed of a single layer of metal cords. The carcass reinforcement 2 is hooped by a crown reinforcement 5, itself capped by a tread 6. The tread comprises five grooves 3 forming six ribs 4.

The low regions and the beads of the tire 1 are notably not depicted in the FIGURE.

In the FIGURE, the crown reinforcement 5 is formed radially from the inside to the outside:
- of a triangulation layer 51 formed of non-wrapped inextensible 9.28 metal cords which are continuous across the entire width of the ply and oriented at an angle of 65°,
- of a first working layer 52 formed of non-wrapped inextensible 11.35 metal cords which are continuous across the entire width of the ply and oriented at an angle of 26°,
- of a second working layer 53 formed of non-wrapped inextensible 11.35 metal cords which are continuous across the entire width of the ply, oriented at an angle of 18° and crossed with the metal cords of the first working layer,
- of a protective layer 54 formed of non-wrapped elastic 18.23 metal cords which are continuous across the entire width of the ply and oriented at an angle of 18° in the same direction as the metal cords of the working layer 53.

According to an embodiment of the invention, the tread 6 is made up of a first layer consisting of a first elastomeric compound 61, radially on the outside which comes into contact with the ground, of a second layer, radially in contact with the first layer, consisting of a second elastomeric compound 62, and of a third layer, radially furthest towards the inside, formed of four parts consisting of the second compound 62, forming the second layer, and of five parts consisting of the third compound 63.

The first elastomeric compound 61 has a value tan(δ)max equal to 0.135 and therefore higher than 0.110. Moreover, this first elastomeric compound 61 has a G* modulus equal to 1.7 MPa which gives it properties in terms of wear which is satisfactory for the intended applications.

The second elastomeric compound 62 has a value tan(δ) max equal to 0.080 which is therefore indeed at least 10% lower than that of the first elastomeric compound 61. This second elastomeric compound 62 has a G* modulus equal to 1.65 MPa giving satisfactory properties in terms of wear, notably at the end of tread life.

The third elastomeric compound 63 has a maximum value of tan (δ), denoted tan(δ)max, equal to 0.045. This third elastomeric compound 63 forms five parts, of the radially innermost layer of the tread, which are at least 1 mm away from the walls of the grooves 3.

The groove 3 passing through the circumferential plane is not intended to be recut. That is the explanation for the presence of an axially continuous part of the third elastomeric compound 63 radially on the inside of this groove 3. This choice of tread pattern at the end of the life of the tire which then only comprises four grooves allows the amount of elastomeric compound 63 and therefore the rolling resistance performance to be optimized.

The ratio of the volume of the first elastomeric compound 61 to the sum of the volumes of the three compounds is equal to 64%.

The ratio of the volume of the second elastomeric compound 62 to the sum of the volumes of the three compounds is equal to 19%.

The ratio of the volume of the third elastomeric compound 63 to the sum of the volumes of the three compounds is equal to 17%.

Tires were produced based on the three elastomeric compounds described hereinbelow with some of their properties.

|  | Compound A | Compound B | Compound C |
|---|---|---|---|
| NR | 80 | 100 | 100 |
| BR | 20 |  |  |
| N234 | 48 |  |  |
| N683 |  |  | 35 |
| Silica (165) m2/G |  | 50 | 10 |
| N330/Coupling agent Covering agent |  | 5/5 | 1/1 |
| Anti Oxidant | 3 | 2.5 | 1 |
| PARAFFIN | 1 | 1 |  |
| STEARIC ACID | 2 | 2.5 | 1.5 |
| ZnO | 3 | 3 | 4.5 |
| SULPHUR | 1.5 | 1.5 | 1.5 |
| Accelerator (CBS) | 0.9 | 1.8 | 1.4 |
| G * 50% cc/60° C./10 Hz (MPa) | 1.7 | 1.65 | 1.4 |
| tan(δ)$_{max}$ | 0.135 | 0.080 | 0.045 |

The first tire is a reference tire R produced to a configuration corresponding to conventional productions as described hereinabove, consisting of two radially superposed layers, the radially inner layer being formed of a single elastomeric compound. It combines a compound A present radially on the outer side of the tread and a radially inside compound C. The volume of compound C is defined in the conventional way by a person skilled in the art so that the operating temperature of the tire corresponds to the driving envisaged with such a tire. In this particular instance, the volume of compound C represents 17% of the sum of the volumes of compounds A and C.

A tire T according to the invention and as described in the associated FIGURE, combines, in order to form the tread, compound A which forms the radially outer part and corresponds to the first compound 61, compound B, which corresponds to the second compound 62, and compound C, which corresponds to the third compound 63.

In order to make a comparison, similar tests were run with the two tires.

The first tests involved evaluating the distance covered by the tires before they needed to be retreaded.

The tests are carried out under load and speed conditions defined so as to lead to tread wear of the reference tire R that allows it to be retreaded after a certain distance, assigned the value 100, covered under the said conditions of this test. The wear performance is evaluated on a heavy vehicle when driving on an open road over routes representative of the usage to which heavy vehicles are conventionally put. Values lower than 100 express inferior wear performance.

The results obtained are given in the following table:

|      | Tire R | Tire T |
|------|--------|--------|
| Wear | 100    | 95     |

These results show that the tire according to the invention allows running that is substantially equivalent to that of the reference tire before retreading is needed.

Rolling resistance measurements were also carried out on each of the tires under identical running conditions. The results of the measurements are shown in the following table; they are expressed in kg/t, with a value of 100 assigned to tire R. Values below 100 express superior performance in terms of rolling resistance.

| Tire R | Tire T |
|--------|--------|
| 100    | 90     |

These values demonstrate the benefit of the tire according to the invention in terms of rolling resistance. The presence of compound B makes it possible to improve the tire operating temperatures.

The tire thus defined according to the invention has therefore made it possible to offset the compromise between wear performance and rolling resistance in favor of rolling resistance, the impact on wear performance being only very small.

Furthermore, the absence of compound C near the grooves of the tread means that a regrooving step can be carried out in order to recreate grooves before having to envisage the step of retreading.

The invention must not be interpreted as being restricted to such a design. Specifically, the tire according to the invention may be designed to target another compromise and for example target an even more appreciable improvement in rolling resistance by accepting a loss in terms of wear performance while at the same time maintaining a greater ability for regrooving than the reference tire.

What is claimed is:

1. A tire with a radial carcass reinforcement, comprising:
a crown reinforcement,
a tread radially capping the crown reinforcement, a tread pattern of which comprises at least three circumferential grooves,
two beads,
two side walls connecting the two beads to the tread,
wherein the tread comprises at least three radially superposed layers of elastomeric compounds,
wherein a first elastomeric compound constituting a first layer forming the radially outer part of the tread has a maximum value of tan(d) at 60° C., denoted tan(d)max, greater than 0.110,
wherein a second elastomeric compound constituting a second layer radially on the inside of and in contact with the first layer of elastomeric compound has a maximum value of tan(d) at 60° C., denoted tan(d)max, at least 10% lower than that of the first elastomeric compound,
wherein the radially innermost third layer of the tread consists of at least two first parts and of at least three second parts axially, each one in contact with at least one of the at least two first parts,
wherein each of the at least two first parts are axially centered on a radial plane passing through one of the at least three circumferential grooves;
wherein the at least two first parts consist of the second compound,
wherein the at least three second parts consist of a third elastomeric compound having a maximum value of tan(d) at 60° C., denoted tan(d)max, at least 10% lower than that of the second elastomeric compound; and
wherein each of said at least three circumferential grooves extend radially along the corresponding radial plane through only the first layer of the tread.

2. The tire according to claim 1, wherein the first elastomeric compound constituting the radially outermost first layer of the tread has a G* modulus greater than 1.7 MPa.

3. The tire according to claim 1, wherein the second elastomeric compound constituting the second layer has a G* modulus greater than 1.2 MPa.

4. The tire according to claim 1, wherein the second elastomeric compound has a maximum value of tan(d) at 60° C., denoted tan(d)max, of between 0.060 and 0.110.

5. The tire according to claim 1, wherein the third elastomeric compound has a maximum value of tan(d) at 60° C., denoted tan(d)max, less than 0.060.

6. The tire according to claim 1, wherein the ratio of the volume of the first elastomeric compound to the sum of the volumes of the three elastomeric compounds is between 25 and 70%.

7. The tire according to claim 1, wherein the ratio of the volume of the second elastomeric compound to the sum of the volumes of the three elastomeric compounds is between 10 and 40%.

8. The tire according to claim 1, wherein the ratio of the volume of the third elastomeric compound to the sum of the volumes of the three elastomeric compounds is less than 25%.

* * * * *